United States Patent
Sonneborn et al.

[11] Patent Number: 6,068,074
[45] Date of Patent: May 30, 2000

[54] HYDRAULIC TILTING DEVICE FOR A CAB

[75] Inventors: Lambertus J. Sonneborn, Oldenzaal; Gerhardus E. R. ter Horst, Eibergen, both of Netherlands

[73] Assignee: Applied Power Incorporated, Butler, Wis.

[21] Appl. No.: 09/294,991

[22] Filed: Apr. 19, 1999

Related U.S. Application Data

[63] Continuation of application No. PCT/NL97/00572, Oct. 14, 1997.

[30] Foreign Application Priority Data

Oct. 23, 1996 [NL] Netherlands .............................. 1004341

[51] Int. Cl.⁷ .................................................. B62D 27/00
[52] U.S. Cl. ..................................... 180/89.14; 180/89.15; 60/484
[58] Field of Search .............................. 180/89.13, 89.14, 180/89.15, 89.16, 89.18; 254/418, 419; 60/477, 481, 484; 280/420, 421

[56] References Cited

U.S. PATENT DOCUMENTS

| | | |
|---|---|---|
| 3,800,537 | 4/1974 | Denis . |
| 4,440,252 | 4/1984 | Steinecke et al. .................. 180/89.15 |
| 4,442,912 | 4/1984 | Vette .................................... 180/89.15 |
| 4,446,939 | 5/1984 | Oudelaar .............................. 180/89.15 |

FOREIGN PATENT DOCUMENTS

| | | |
|---|---|---|
| 0 078 348 | 3/1986 | European Pat. Off. . |
| 0 081 927 | 7/1986 | European Pat. Off. . |
| 0 248 505 | 12/1987 | European Pat. Off. . |
| 2 024 709 | 8/1970 | France . |
| 3426828 | 1/1986 | Germany . |
| 3515956 | 7/1986 | Germany . |
| 59-45271 | 3/1984 | Japan . |
| 60-99772 | 6/1985 | Japan . |
| 2 134 600 | 8/1984 | United Kingdom . |

*Primary Examiner*—Kevin Hurley
*Assistant Examiner*—Lynda Jasmin
*Attorney, Agent, or Firm*—Quarles & Brady LLP

[57] ABSTRACT

A hydraulic tilting device intended to be fitted on a vehicle with a tiltable cab for the purpose of tilting the tiltable cab. The tilting device has a hydraulic tilting unit with a double-acting hydraulic tilting cylinder for tilting the cab, and also a reservoir and a pump. The tilting device furthermore has an additional hydraulic cylinder, for example a locking cylinder, which additional cylinder is connected to the tilting unit via a system of lines. Each of the connecting lines comprises a part associated with the additional cylinder and a part associated with the tilting unit, which parts can be coupled to one another by a disconnectable coupling.

5 Claims, 1 Drawing Sheet

HYDRAULIC TILTING DEVICE FOR A CAB

CROSS-REFERENCE TO RELATED APPLICATIONS

This is a continuing application of PCT/NL97/00572 filed Oct. 14, 1997.

FIELD OF THE INVENTION

The present invention relates to a hydraulic tilting device for a cab, in particular a truck cab.

BACKGROUND OF THE INVENTION

A tilting device for tilting the cab of a truck is known from for example EP 0 081 927 and EP 0 078 348.

In EP 0 078 348 the tilting cylinder, on the one hand, and the pump/reservoir-assembly, on the other hand, are separate components, which components are connected to one another via a system of fluid lines. Furthermore, the tilting device known from EP 0 078 348 comprises a hydraulic locking cylinder for operating a lock, by means of which the cab of the vehicle is locked in a position associated with driving the vehicle. This locking cylinder is likewise connected to the pump/reservoir-assembly via a system of fluid lines.

OBJECT OF THE INVENTION

The object of the present invention is to provide the tilting device known from EP 0 081 927 with an additional cylinder, in particular a locking cylinder or a second tilting cylinder, so that substantially the construction of the tilting device known from EP 0 078 348 is obtained. Furthermore, it is an object of the invention to design the addition to the known tilting device consisting of the additional cylinder such that the tilting device can be fitted to the vehicle very expediently, in particular with little fitting time and effort.

SUMMARY OF THE INVENTION

The present invention provides a hydraulic tilting device which comprises an additional hydraulic cylinder, which additional cylinder is connected to the tilting unit via a system of fluid lines, which comprises one or more connecting fluid lines, each of the connecting fluid lines comprising a part associated with the additional cylinder and a part associated with the tilting unit, which parts can be coupled to one another by a disconnectable coupling, the coupling comprising a first coupling member, which is arranged on that part of the connecting fluid line which is associated with the tilting unit, and a second coupling member, which can be coupled to the first coupling member and is arranged on that part of the connecting fluid line which is associated with the additional cylinder, the first coupling member and the second coupling member being uncoupled from one another, and each of the coupling members being provided with shut-off means which shut off that part of the connecting fluid line which is connected thereto, and hydraulic fluid being present in the tilting unit and the associated part, which is shut off by shut-off means, of the system of fluid lines. Hydraulic fluid is present in the assembly of the additional cylinder and the associated part of the system of fluid lines. Thereby the tilting device according to the invention comprises at least two mounting parts, namely a first mounting part, which comprises the tilting unit filled with hydraulic fluid and the adjoining part of the system of fluid lines, and a second mounting part which comprises the additional cylinder and the adjoining part of the system of fluid lines.

The invention thus relates specifically to the structure of the tilting device in the form adapted for fitting on the vehicle, which fitting usually takes place during production of the vehicle. The design of the tilting device of the present invention permits considerably quicker fitting than is possible with the tilting device known from EP 0 078 348, in the case of which known tilting device the total assembly of cylinders, pump, reservoir and connecting lines forms a unit which has to be mounted as a whole. Another important advantage of the lifting device according to the invention is that one single design of the tilting unit can be produced for various different designs of the tilting device and that the additional cylinder can be designed to match the particular situation, for example as a locking cylinder or as an additional tilting cylinder for the cab. This leads to lower stock-holding and production costs for the manufacturer of the tilting devices.

The invention is explained in more detail below with reference to a preferred embodiment.

DETAILED DESCRIPTION OF THE PREFERRED EMBODIMENT

Figure 1:
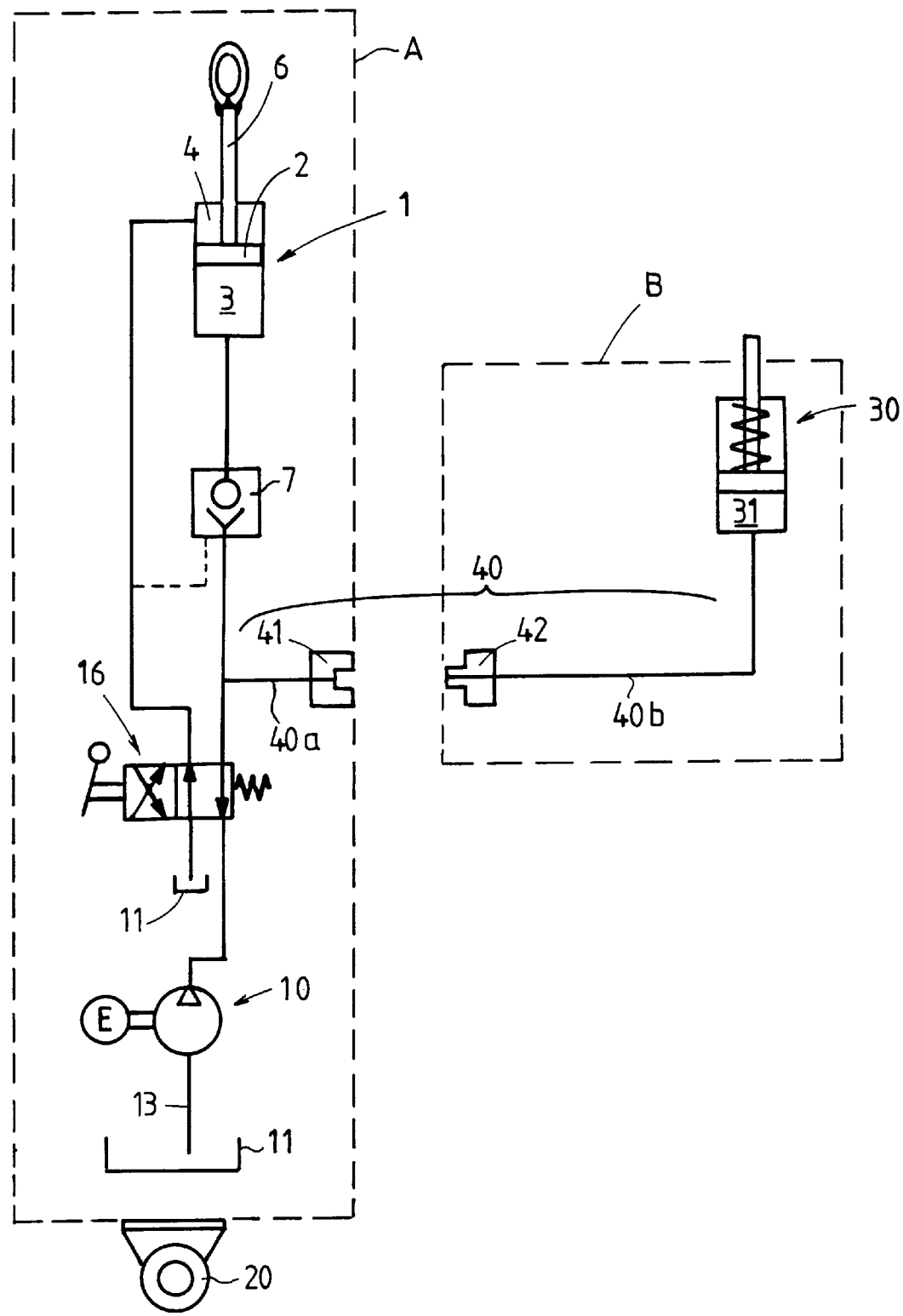
FIG. 1 shows diagrammatically a preferred embodiment of the cab tilting and locking device according to the invention.

The tilting and locking device depicted in FIG. 1 is adapted to be fitted on a vehicle with a tiltable cab and serves to tilt the cab and to lock the cab in the position associated with driving the vehicle.

The tilting device here comprises two mutually separate mounting parts, which are here referred to by the terms tilting unit and locking unit and which are indicated in FIG. 1 by dashed lines at A and B, respectively.

The tilting unit A of the device comprises a double-acting hydraulic cylinder 1, of which piston 2 in the cylinder 1 delimits two cylinder chambers 3 and 4. As is usual, the cylinder 1 is arranged between the tiltable cab and the chassis of the vehicle in such a way that, in the event of hydraulic fluid being supplied to the cylinder chamber 3, the cabin tilts forwards. A hydraulically operated non-return valve 7 in its closed position prevents fluid from flowing out of the associated cylinder chamber 3.

The tilting unit A furthermore comprises an electrically driven pump 10 and a reservoir 11 for hydraulic fluid. A suction line 13 connects the reservoir 11 to pump 10. Furthermore, the tilting unit comprises a manually operable slide valve 16.

The defining characteristic of the tilting unit is that all the components situated within the dashed line A form a single unit, meaning that the pump 10 and the reservoir 11 are arranged directly on the cylinder 1. In order to mount such a unit on the vehicle, the tilting unit A is provided with a fastening member 20, which is designed to fasten the tilting unit A to the chassis or to the cab of the vehicle. At the opposite end, the free end of piston rod 6 of the cylinder 1 is designed to fasten that end to the cab or the chassis, respectively, of the vehicle.

The locking unit B comprises a spring-return single-acting hydraulic cylinder 30, which cylinder 30 is intended to operate a mechanical lock (not shown), by means of which the cab of the vehicle can be locked in the position associated with driving the vehicle. The cylinder 30 has a cylinder chamber 31 which is delimited by a piston of the said cylinder.

The cylinder 30, in particular the cylinder chamber 31, is to be connected to the tilting unit A in order to allow the cylinder 30 to function.

For this purpose, a system of fluid lines is provided, which in this case comprises a single connecting line 40 which forms the fluid connection between the tilting unit A and the locking unit B. A disconnectable coupling 41 is provided in the connecting line 40, which coupling comprises a first coupling member 42, which is arranged on a part 40a, which is connected to the tilting unit A, of the connecting line 40, and a second coupling member 42, which can be coupled to the first coupling member 41 and is arranged on a part 40b, which is connected to the locking cylinder 30, of the connecting line 40.

It can be seen in the figure that the first coupling member 41 and the second coupling member 42 are uncoupled from one another in the state prior to mounting the tilting device on the vehicle.

Each of the coupling members 41, 42 is provided with shut-off means (not shown), which shut off that part of the connecting line which is connected thereto. In a very simple design, these shut-off means comprise a shut-off cap or shut-off plug which can be removed, preferably manually, and is arranged over or in the free end of the relevant part of the connecting line 40.

In a preferred embodiment, the shut-off means are integrated in each of the coupling members 41, 42 and the shut-off means are designed to automatically shut off the relevant part of the connecting line 40 when the first coupling member 41 and second coupling member 42 are not coupled together. Such a design of the coupling members is known per se from hydraulic rapid-action couplings. However, couplings of this kind are expensive, in particular considerably more expensive than conventional threaded union couplings. The time gained in fitting the tilting device according to the invention justifies the use of an expensive coupling. Advantageously, it is provided for the first coupling member 41 to be integrated into the tilting unit in such a manner that the first coupling member 41, and in any event the body thereof, forms an integral part of the housing of the tilting unit. In particular, it is provided for the body of the first coupling member to be produced by machining the housing of the tilting unit and to delimit a passage for the hydraulic fluid. The shut-off means, for example a shut-off body which is preloaded towards its seat by means of a spring, are then arranged in that passage.

Furthermore, the tilting device shown in FIG. 1 is characterized in that the hydraulic fluid which is required to operate the tilting and locking device is present in the tilting unit A and the associated part 40a, which is shut off by shut-off means, of the connecting line 40, and in that hydraulic fluid is present in the assembly of the locking cylinder 30 and the associated part 40b of the connecting line 40.

When mounting the above-described tilting and locking device on a vehicle, the two mounting parts A and B may be arranged separately on the vehicle and then the two coupling members 41 and 42 can be connected to one another, after which the device is ready for use. This is achieved particularly quickly and reliably if the coupling members 41 and 42 together form a rapid-action coupling with shut-off means integrated in both parts of the coupling, which shut-off means open as soon as the parts of the rapid-action coupling are connected to one another.

What is claimed is:

1. A hydraulic tilting device to be fitted on a vehicle with a tiltable cab for the purpose of tilting the tiltable cab, which hydraulic tilting device comprises a hydraulic tilting unit having a double-acting hydraulic tilting cylinder for tilting the cab, and also having a reservoir for hydraulic fluid and having a pump for pumping the hydraulic fluid, the reservoir and the pump being arranged directly on the tilting cylinder, so that the tilting unit forms a single component, wherein the hydraulic tilting device furthermore comprises an additional hydraulic cylinder, which additional cylinder is connected to the hydraulic tilting unit via a system of fluid lines, said fluid lines comprising a cylinder part associated with the additional cylinder and a tilting unit part associated with the tilting unit, a disconnectable coupling being provided in each of said parts, the disconnectable coupling comprising a first coupling member, which is arranged on the tilting unit part of the connecting fluid lines and a second coupling member, which can be coupled to the first coupling member and is arranged on the cylinder part of the connecting fluid lines, the first coupling member and the second coupling member being uncoupled from one another, wherein the first and second coupling members are provided with shut-off means which shut off the associated part of the fluid lines, and wherein hydraulic fluid is present in the tilting unit and the tilting unit part of the fluid lines, and wherein hydraulic fluid is present in the additional cylinder and the cylinder part of the fluid lines.

2. Tilting device according to claim 1, in which the additional cylinder is a second tilting cylinder for tilting the cab of the vehicle.

3. Tilting device according to claim 1, in which the additional cylinder is a locking cylinder for operating a lock which locks the cab in a position associated with driving the vehicle.

4. A hydraulic tilting device to be fitted on a vehicle with a tiltable cab for the purpose of tilting the tiltable cab, which hydraulic tilting device comprises a hydraulic tilting unit having a double-acting hydraulic tilting cylinder for tilting the cab, and also having a reservoir for hydraulic fluid and having a pump for pumping the hydraulic fluid, the reservoir and the pump being arranged directly on the tilting cylinder, so that the tilting unit forms a single component, wherein the hydraulic tilting device furthermore comprises an additional hydraulic cylinder, which additional cylinder is connected to the hydraulic tilting unit via a system of fluid lines, said fluid lines comprising a cylinder part associated with the additional cylinder and a tilting unit part associated with the tilting unit, a disconnectable coupling being provided in each of said parts, the disconnectable coupling comprising a first coupling member, which is arranged on the tilting unit part of the connecting fluid lines and a second coupling member, which can be coupled to the first coupling member and is arranged on the cylinder part of the connecting fluid lines, the first coupling member and the second coupling member being uncoupled from one another, wherein the first and second coupling members are provided with shut-off means which shut off the associated part of the fluid lines, and wherein hydraulic fluid is present in the tilting unit and the tilting unit part of the fluid lines, and wherein hydraulic fluid is present in the additional cylinder and the cylinder part of the fluid lines;

and wherein the shut-off means are integrated in each of the first and second coupling members and automatically shut off the connecting fluid line if the first and second coupling members are uncoupled.

5. A hydraulic tilting device to be fitted on a vehicle with a tiltable cab for the purpose of tilting the tiltable cab, which hydraulic tilting device comprises a hydraulic tilting unit having a double-acting hydraulic tilting cylinder for tilting the cab, and also having a reservoir for hydraulic fluid and having a pump for pumping the hydraulic fluid, the reservoir and the pump being arranged directly on the tilting cylinder, so that the tilting unit forms a single component, wherein the hydraulic tilting device furthermore comprises an additional hydraulic cylinder, which additional cylinder is connected to the hydraulic tilting unit via a system of fluid lines, said fluid lines comprising a cylinder part associated with the additional cylinder and a tilting unit part associated with the tilting unit, a disconnectable coupling being provided in each of said parts, the disconnectable coupling comprising a first coupling member, which is arranged on the tilting unit part of the connecting fluid lines and a second coupling member, which can be coupled to the first coupling member and is arranged on the cylinder part of the connecting fluid lines, the first coupling member and the second coupling member being uncoupled from one another, wherein the first and second coupling members are provided with shut-off means which shut off the associated part of the fluid lines, and wherein hydraulic fluid is present in the tilting unit and the tilting unit part of the fluid lines, and wherein hydraulic fluid is present in the additional cylinder and the cylinder part of the fluid lines;

wherein the shut-off means are integrated in each of the first and second coupling members and automatically shut off the connecting fluid line if the first and second coupling members are uncoupled, and in which the first coupling member comprises a body with a passage for hydraulic fluid, the shut-off means being accommodated in the passage, and the body of the first coupling member forming an integral part of the housing of the tilting unit.

* * * * *